United States Patent Office 2,842,530
Patented July 8, 195_

2,842,530

VULCANIZATION OF POLYCHLOROPRENE WITH TETRACHLOROBENZENEDITHIOL

Peter Kovacic, Wilmington, Del., assignor to E. I. du Pont de Nemours and Company, Wilmington, Del., a corporation of Delaware No Drawing. Application April 23, 1954
Serial No. 425,325

3 Claims. (Cl. 260—92.3)

This invention relates to the vulcanization of elastomers, and more particularly to an improved process for vulcanizing polychloroprene, generally referred to in the trade as "neoprene."

In general, the polychloroprene rubbers differ from other synthetic rubbers and from natural rubber in the manner in which they are vulcanized. Vulcanization of the polychloroprene elastomers is usually brought about by incorporating therein certain metal oxides such as magnesia and zinc oxide, and heating to effect vulcanization. In certain cases litharge is employed in place of the magnesia or zinc oxide, and for some types of chloroprene polymers sulfur is employed but is not necessary to effect vulcanization.

Where a more rapid rate of cure is desired, there is usually added in addition to the agents mentioned above certain accelerators such as catechol, hexamethylenetetramine, diorthotolyl guanidine salts of catechol borate, etc.

The disadvantage of the use of many of these accelerators heretofore disclosed for use in the vulcanization of polychloroprene is that they so speed up the vulcanization as to render the material "scorchy," that is, so active that the vulcanization takes place at lower temperatures as well as at the usual vulcanizing temperatures.

It is an object of the present invention to provide a new and valuable vulcanizing agent for polychloroprene rubbers which permits ready working of the polychloroprene when incorporated in the massive polymer but which effects good cures at vulcanizing temperatures. It is a further object of the invention to provide a vulcanizing agent which can be readily employed in polychloroprene latices, giving cures that exihibit advantages over the vulcanizing agent generally recommended for use in elastomer latices.

In co-pending application Serial No. 346,020 of Josef Pikl, now Patent No. 2,765,345, the use of polychlorobenzenethiols, including tetrachlorobenzenedithiol and its zinc salt, have been disclosed as useful as peptizing agents for natural and certain synthetic rubbers. These agents when exhibiting a peptizing action cause softening of the rubber or other elastomer so that it can be more readily worked. This plasticizing action permits the rubber to be milled and compounded more satisfactorily during the milling processes.

I have now found that tetrachlorobenzenedithiol, its alkali metal and zinc salts, when incorporated in polychloroprene elastomers act as vulcanizing agents and give a vulcanized product which has very desirable properties. This vulcanizing action is in general considered to be the opposite of the plasticizing action, for in the case of vulcanization there is generally considered to be a crosslinking, giving the elastomer greater rigidity, strength and elasticity as distinguished from the plasticizing action which either chemically or physically breaks down the material to a more plastic product, and therefore reduces its elasticity.

The tetrachlorobenzenedithiols of this invention may be used as vulcanization accelerators for polychloroprene, either as the free dithiol or in the form of its zinc sal_ Where the dithiol itself is added to the elastomer late_ it may be used in the form of the sodium salt or _ converted in the latex to the sodium or other salt du_ to the excess alkali present in the latex. The use of th_ zinc salt is preferred, since it is less soluble than th_ sodium or other alkali metal or ammonium salt an_ therefore has less tendency to be lost due to the wate_ solubility.

The dithiol, its zinc or sodium salt, is simply adde_ to the polychloroprene latex, which is otherwise con_ pounded in the usual manner. The latex may contain, i_ addition to the vulcanization accelerator and antiox_ dant, the usual vulcanizing agents, fillers, peptizing agent_ colors and other types of compounding ingredients con_ monly used. The latex thus prepared can be employe_ in the usual dipping processes, or they can be coagulate_ and processed into slabs or pellets or other forms suitab_ for use in molding operations. The vulcanization a_ celerator of this invention may also be added to th_ polychloroprene in the massive form as it is worked o_ the usual rubber mills in the same manner as oth_ compounding agents are incorporated in the polym_ prior to vulcanization.

The following examples are given to more fully illu_ trate the invention. The parts used are by weight.

EXAMPLE 1

Dip films were made from polychloroprene prepare_ by the emulsion polymerization of chloroprene as d_ scribed in Example 25 of U. S. Patent 2,264,173. Th_ compounding ingredients consisted of 1% of 2.2'-methy_ ene-bis(4-methyl-6-tertiary-butylphenol) as an antiox_ dant, 5% of zinc oxide as vulcanizing agent and variou_ amounts of the tetrachlorobenzenedithiol accelerator _ shown below. All precentages are based on the polychl_ roprene solids. The tetrachlorobenzenedithiol was adde_ as the monosodium salt obtained by dissolving the fr_ dithiol in equivalent amount of NaOH solution. Th_ effectiveness of the accelerator is shown in Table _ where comparison with the well known thiocarbanilid_ sulfur accelerator is also given.

Table 1

| Cure: Min./° C. | No Accelerator | Thiocarbanilide (1%), Sulfur (1%) | Monosodium Salt of Tetrachl_ robenzen_ dithiol (2%) |
|---|---|---|---|
| 120/70° (drying): | | | |
| 600% Modulus (p. s. i.) | 450 | 425 | _ |
| Tensile at break (p. s. i.) | 2,100 | 1,875 | 2,_ |
| Elongation at break (percent) | 960 | 960 | _ |
| Permanent set at break (percent) | 10 | 10 | |
| 30/100°: | | | |
| 600% Modulus (p. s. i.) | 375 | 475 | 1,_ |
| Tensile at break (p. s. i.) | 2,225 | 2,350 | 2,_ |
| Elongation at break (percent) | 1,000 | 940 | _ |
| Permanent set at break (percent) | 10 | 5 | |
| 60/120°: | | | |
| 600% Modulus (p. s. i.) | 425 | 1,625 | 1,_ |
| Tensile at break (p. s. i.) | 2,550 | 1,625 | 2,_ |
| Elongation at break (percent) | 1,000 | 600 | _ |
| Permanent set at break (percent) | 5 | 5 | |

EXAMPLE 2

Thirty (30) parts of a polychloroprene prepared by t_ process of U. S. Patent 2,494,087 was milled in the co_ ventional manner together with 0.3 part of phenyl-bet_ naphthylamine, 9 parts of semi-reinforcing furnace blac_ 1.2 parts of magnesium oxide, 1.5 parts of zinc oxide a_

0.3 part of tetrachlorobenzenedithiol. After curing for 45 minutes at 141° C., the following data was obtained:

|  | Accelerator | |
| --- | --- | --- |
|  | None | Tetrachlorobenzenedithiol |
| 300% Modulus (p. s. i.) | 710 | 1,480 |
| Tensile strength at break (p. s. i.) | 2,130 | 3,040 |
| Elongation at break, percent | 550 | 480 |

EXAMPLE 3

Dip films were prepared as described in Example 1. The dispersion of the zinc salt of tetrachlorobenzenedithiol contained 2 mols of sodium hydroxide per mol of the zinc salt of the accelerator. The following data were obtained from films vulcanized for two hours at 100° C.

|  | No Accelerator | Thiocarbanilide (1%), Sulfur (1%) | $HSC_6Cl_4SNa$ (1%) | Zinc Salt of Tetrachlorobenzenedithiol (1%) |
| --- | --- | --- | --- | --- |
| 600% Modulus (p. s. i.) | 500 | 650 | 875 | 925 |
| 800% Modulus (p. s. i.) | 1,275 | 1,800 | 2,325 | 2,200 |
| Tensile at break (p. s. i.) | 2,575 | 2,925 | 3,200 | 2,825 |
| Elongation at break (percent) | 990 | 880 | 870 | 880 |
| Permanent set at break (percent) | 8 | 3 | 3 | 5 |

The amount of tetrachlorobenzenedithiol or its salts employed in the vulcanization of polychloroprene may vary from 0.2% to 5.0%, based on the weight of the polychloroprene being vulcanized. The usual vulcanization temperatures are employed with this vulcanization accelerator.

The term "polychloroprene" as employed in this application refers to the homopolymers and copolymers of chloroprene in which chloroprene is the predominant monomer. Any of the usual types of polychloroprene elastomers generally referred to in the trade as "neoprene" may be vulcanized according to this invention.

The tetrachlorobenzenedithiol, its alkali and zinc salts employed in this invention may be prepared by the process more particularly disclosed in co-pending application Serial No. 425,301 filed of even date herewith.

As pointed out above, the tetrachlorobenzenedithiols may be used in conjunction with any of the compounding agents normally employed in the particular polychloroprene to be vulcanized, such as antioxidants, fillers, peptizing agents, colors, etc., and may also be used with ordinarily employed vulcanizing agents, as illustrated in the above examples.

I claim:

1. The process for vulcanizing polychloroprene which comprises incorporating in the polychloroprene from 0.2% to 5.0% of a compound of the group consisting of tetrachlorobenzenedithiol, its alkali metal and zinc salts, based on the weight of the polychloroprene to be vulcanized.

2. A polychloroprene latex for use in the preparation of dip films, having incorporated therein from 0.2% to 5.0% of the zinc salt of tetrachlorobenzenedithiol.

3. A readily vulcanizable polychloroprene having incorporated therein as a vulcanization accelerator from 0.2% to 5.0% of a compound of the group consisting of tetrachlorobenzenedithiol, its alkali metal and zinc salts, based on the weight of the polychloroprene.

References Cited in the file of this patent
UNITED STATES PATENTS 2,234,211 Walker _____ Mar. 11, 1941
2,765,345 Pikl _____ Oct. 2, 1956